US012688376B1

(12) United States Patent    (10) Patent No.:   US 12,688,376 B1

Samuel      (45) Date of Patent:    Jul. 21, 2026

(54) PROCESSING COMPLEX DATA STRUCTURES WITH LANGUAGE MODELS

(71) Applicant: Intuit Inc., Mountain View, CA (US)

(72) Inventor: John Samuel, Banglore (IN)

(73) Assignee: Intuit Inc., Mountain View, CA (US)

( * ) Notice:   Subject to any disclaimer, the term of this patent is extended or adjusted under 35 U.S.C. 154(b) by 0 days.

(21) Appl. No.: 19/346,408

(22) Filed:   Sep. 30, 2025

(51) Int. Cl.
     *G06F 40/40*      (2020.01)
(52) U.S. Cl.
     CPC .................................... *G06F 40/40* (2020.01)
(58) Field of Classification Search
     USPC ................................................ 704/8–10, 257
     See application file for complete search history.

(56) References Cited

U.S. PATENT DOCUMENTS

| | | | |
|---|---|---|---|
| 12,461,932 B1 * | 11/2025 | Wycoff | ................. G06F 16/248 |
| 2023/0351108 A1 * | 11/2023 | Lange | .................. G06F 40/216 |
| 2024/0362208 A1 * | 10/2024 | Naufel | .................. G06F 16/243 |
| 2025/0103858 A1 * | 3/2025 | Chen | .................... G06N 3/0455 |

* cited by examiner

*Primary Examiner* — Leonard Saint-Cyr
(74) *Attorney, Agent, or Firm* — Lathrop GPM LLP

(57) ABSTRACT

A method including receiving a complex data structure including a combination of text and an arithmetic function. A normalized data structure is generated by normalizing the complex data structure against a static data structure schema. A numerical solver processes the arithmetic function to generate a function output. A prompt is generated by embedding the function output and the normalized data structure into a template prompt. The template prompt includes a first command to a language model to identify a contextual error in the normalized data structure. The template prompt also includes a context that defines a constraint applicable to the complex data structure. The template prompt also includes a second command to generate a model output formatted according to the static data structure schema. The model output includes the contextual error. The model output is generated by processing the prompt with the language model. The model output is returned.

20 Claims, 6 Drawing Sheets

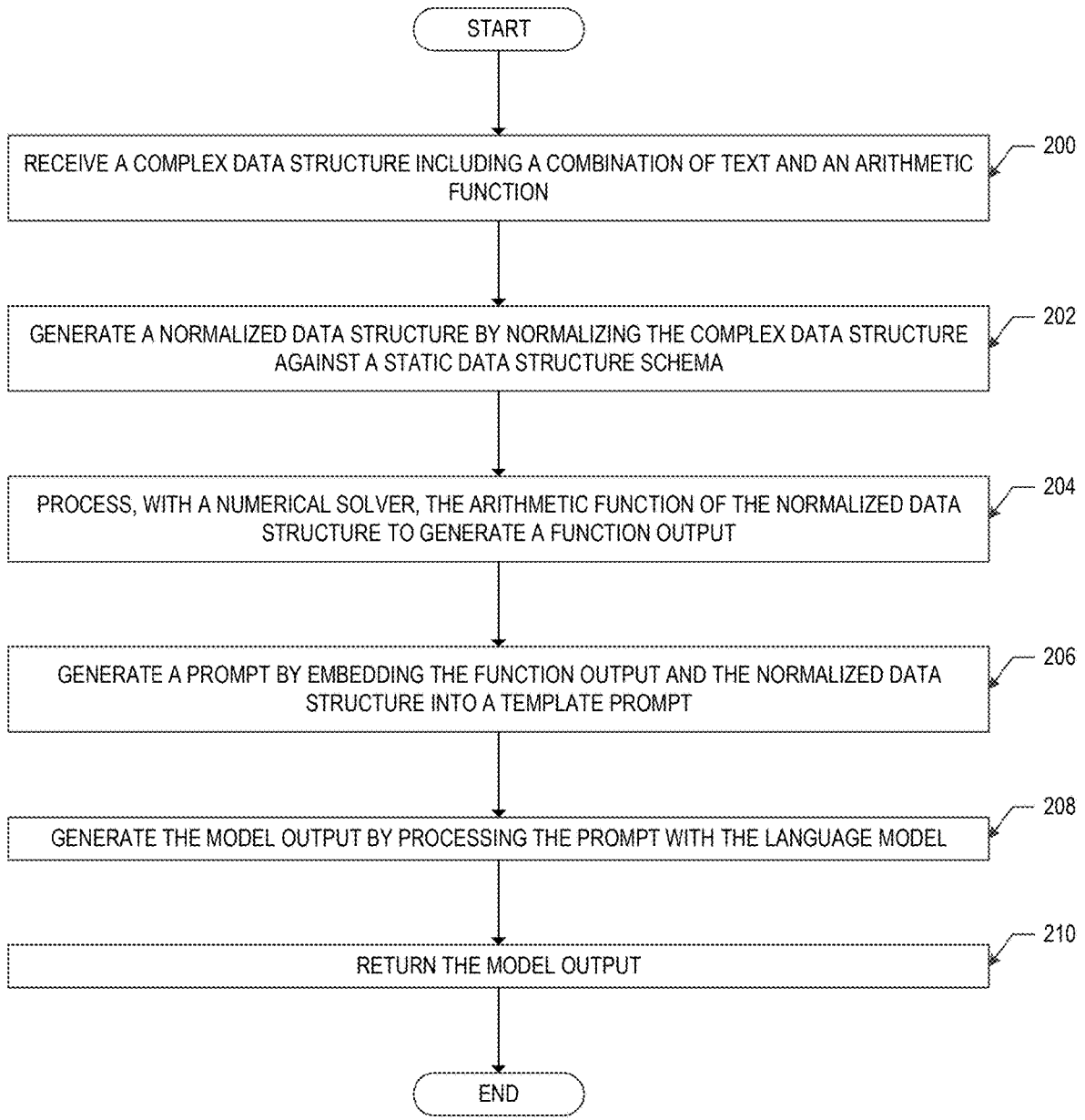

START

RECEIVE A COMPLEX DATA STRUCTURE INCLUDING A COMBINATION OF TEXT AND AN ARITHMETIC FUNCTION — 200

GENERATE A NORMALIZED DATA STRUCTURE BY NORMALIZING THE COMPLEX DATA STRUCTURE AGAINST A STATIC DATA STRUCTURE SCHEMA — 202

PROCESS, WITH A NUMERICAL SOLVER, THE ARITHMETIC FUNCTION OF THE NORMALIZED DATA STRUCTURE TO GENERATE A FUNCTION OUTPUT — 204

GENERATE A PROMPT BY EMBEDDING THE FUNCTION OUTPUT AND THE NORMALIZED DATA STRUCTURE INTO A TEMPLATE PROMPT — 206

GENERATE THE MODEL OUTPUT BY PROCESSING THE PROMPT WITH THE LANGUAGE MODEL — 208

RETURN THE MODEL OUTPUT — 210

END

*FIG. 2*

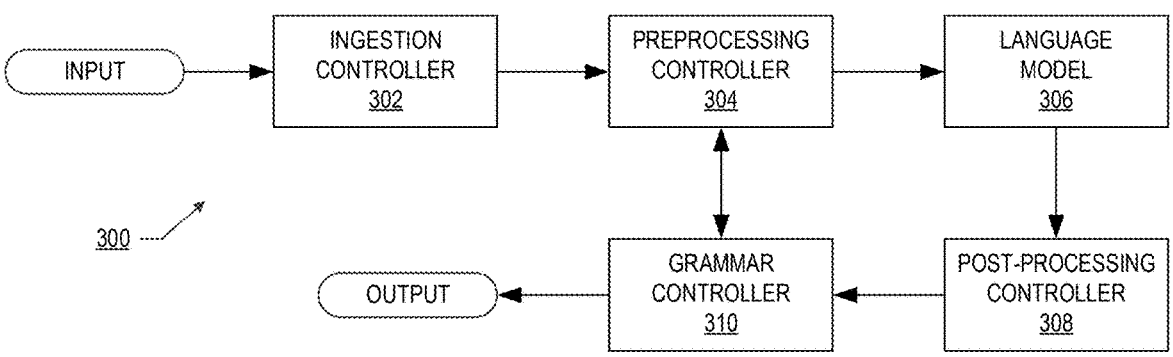

INPUT → INGESTION CONTROLLER 302 → PREPROCESSING CONTROLLER 304 → LANGUAGE MODEL 306

300

OUTPUT ← GRAMMAR CONTROLLER 310 ← POST-PROCESSING CONTROLLER 308

*FIG. 3*

SAMPLE COMPLEX
DATA STRUCTURE
400

```
402    {
           "TAXPAYER": {
               "NAME": "JANE DOE",
               "SSN": "123-45-6789",
               "FILINGSTATUS": "SINGLE",
               "DEPENDENTS": 0
           },
           "INCOME": {
               "WAGES": 85000,
               "INTERESTINCOME": 250
           },
           "ADJUSTMENTS": {
               "STUDENTLOANINTEREST": 1500
           },
           "DEDUCTIONS": {
               "ITEMIZED": FALSE,
               "STATETAX": 3000,
               "CHARITABLECONTRIBUTIONS": 500       // << POTENTIAL ERROR
           },
406        "AGI": {
               ="WAGES"+"INTERESTINCOME"-"ADJUSTMENTS"-"DEDUCTIONS"
           }
           "TAXPAYMENTS": {
               "WITHHELD": 12000
404        }
       }
```

*FIG. 4A*

Figure 4B:
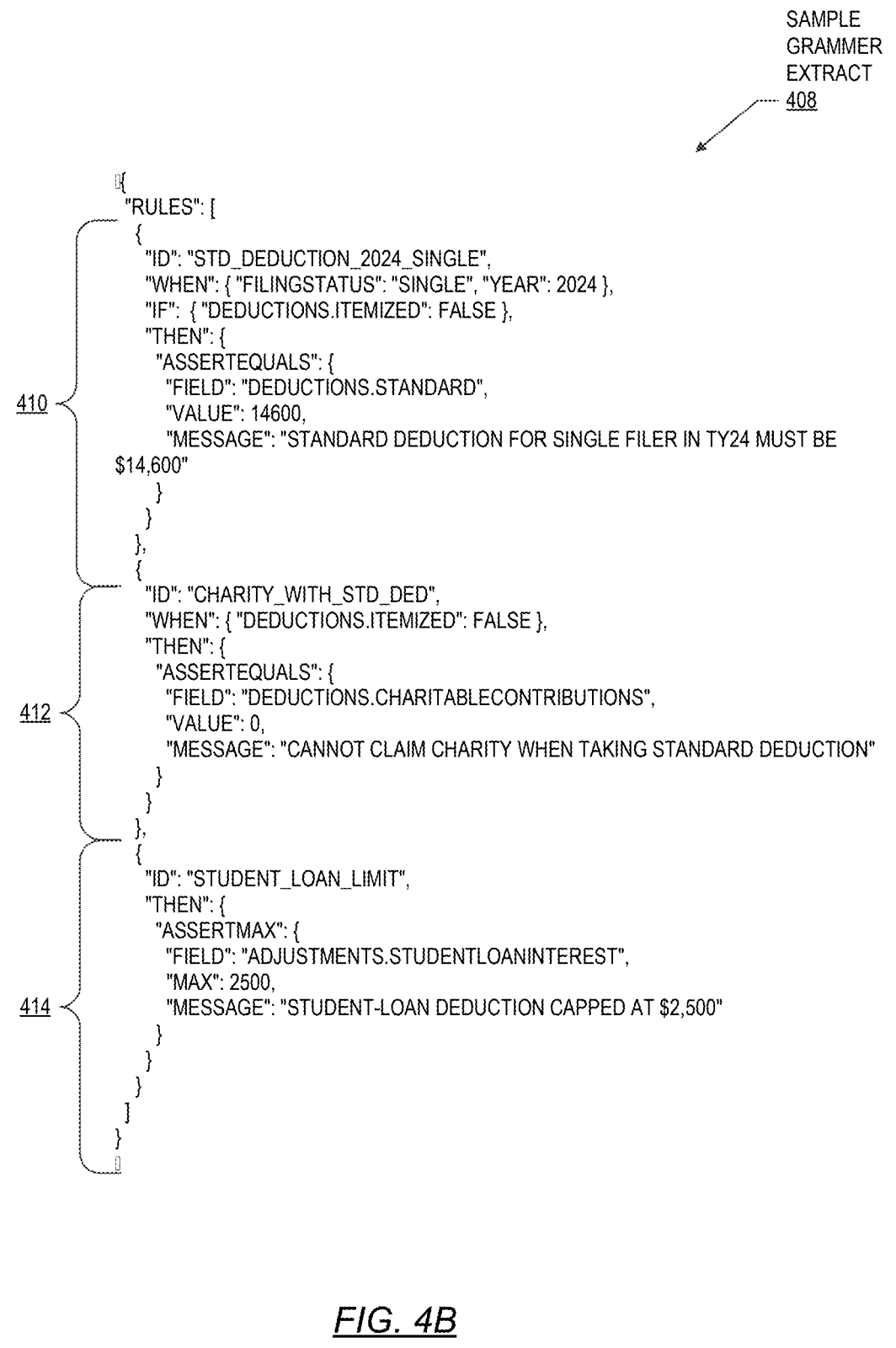

SAMPLE
GRAMMER
EXTRACT
408

```
{
  "RULES": [
    {
      "ID": "STD_DEDUCTION_2024_SINGLE",
      "WHEN": { "FILINGSTATUS": "SINGLE", "YEAR": 2024 },
      "IF": { "DEDUCTIONS.ITEMIZED": FALSE },
      "THEN": {
        "ASSERTEQUALS": {
          "FIELD": "DEDUCTIONS.STANDARD",
          "VALUE": 14600,
          "MESSAGE": "STANDARD DEDUCTION FOR SINGLE FILER IN TY24 MUST BE
$14,600"
        }
      }
    },
    {
      "ID": "CHARITY_WITH_STD_DED",
      "WHEN": { "DEDUCTIONS.ITEMIZED": FALSE },
      "THEN": {
        "ASSERTEQUALS": {
          "FIELD": "DEDUCTIONS.CHARITABLECONTRIBUTIONS",
          "VALUE": 0,
          "MESSAGE": "CANNOT CLAIM CHARITY WHEN TAKING STANDARD DEDUCTION"
        }
      }
    },
    {
      "ID": "STUDENT_LOAN_LIMIT",
      "THEN": {
        "ASSERTMAX": {
          "FIELD": "ADJUSTMENTS.STUDENTLOANINTEREST",
          "MAX": 2500,
          "MESSAGE": "STUDENT-LOAN DEDUCTION CAPPED AT $2,500"
        }
      }
    }
  ]
}
```

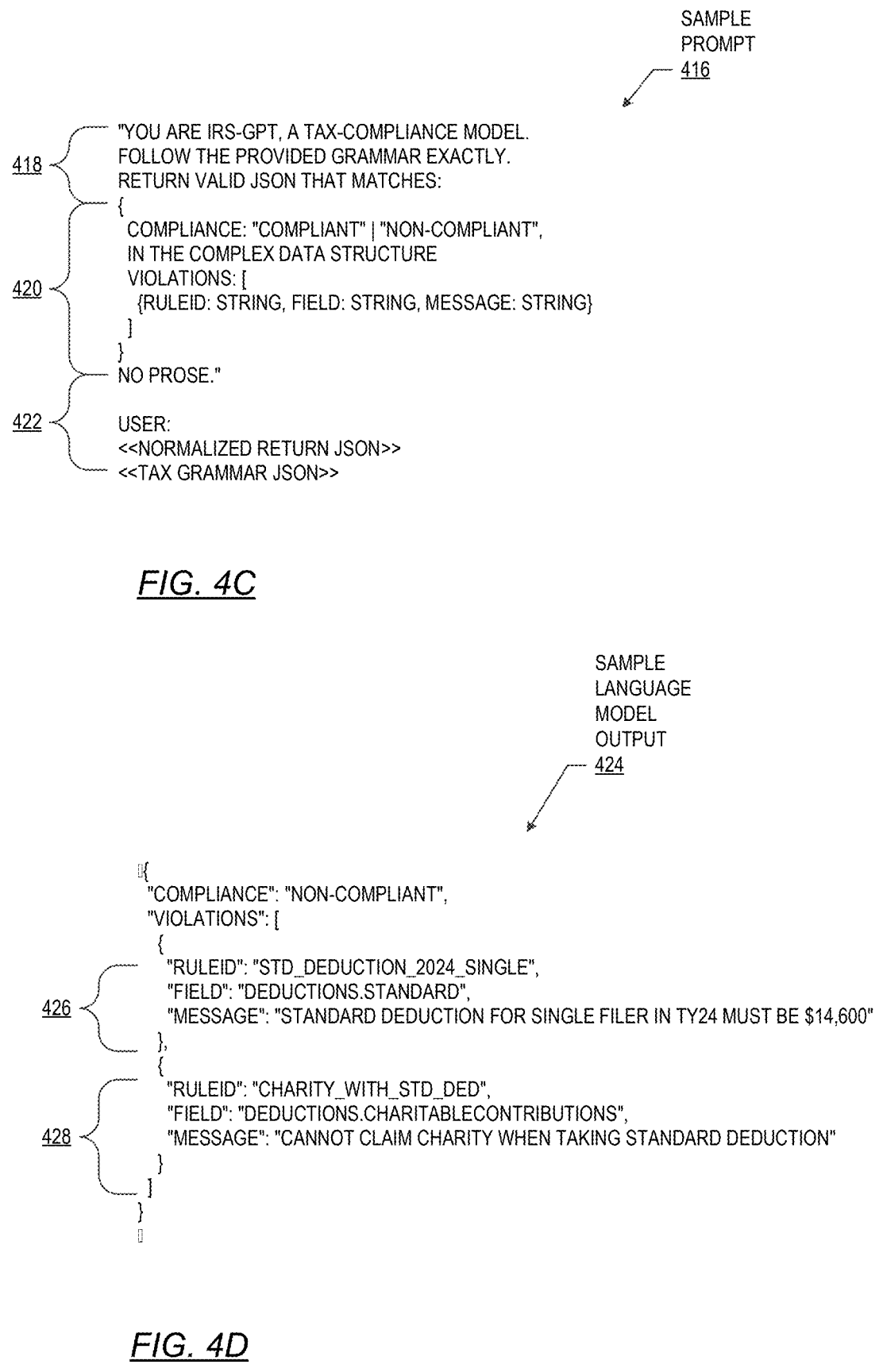

SAMPLE
PROMPT
416

418 {
"YOU ARE IRS-GPT, A TAX-COMPLIANCE MODEL.
FOLLOW THE PROVIDED GRAMMAR EXACTLY.
RETURN VALID JSON THAT MATCHES:

420 {
{
  COMPLIANCE: "COMPLIANT" | "NON-COMPLIANT",
  IN THE COMPLEX DATA STRUCTURE
  VIOLATIONS: [
    {RULEID: STRING, FIELD: STRING, MESSAGE: STRING}
  ]
}

NO PROSE."

422 {
USER:
<<NORMALIZED RETURN JSON>>
<<TAX GRAMMAR JSON>>

FIG. 4C

SAMPLE
LANGUAGE
MODEL
OUTPUT
424

```
{
  "COMPLIANCE": "NON-COMPLIANT",
  "VIOLATIONS": [
    {
```
426 {
```
      "RULEID": "STD_DEDUCTION_2024_SINGLE",
      "FIELD": "DEDUCTIONS.STANDARD",
      "MESSAGE": "STANDARD DEDUCTION FOR SINGLE FILER IN TY24 MUST BE $14,600"
    },
    {
```
428 {
```
      "RULEID": "CHARITY_WITH_STD_DED",
      "FIELD": "DEDUCTIONS.CHARITABLECONTRIBUTIONS",
      "MESSAGE": "CANNOT CLAIM CHARITY WHEN TAKING STANDARD DEDUCTION"
    }
  ]
}
```

FIG. 4D

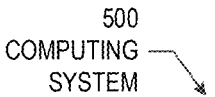
500
COMPUTING
SYSTEM
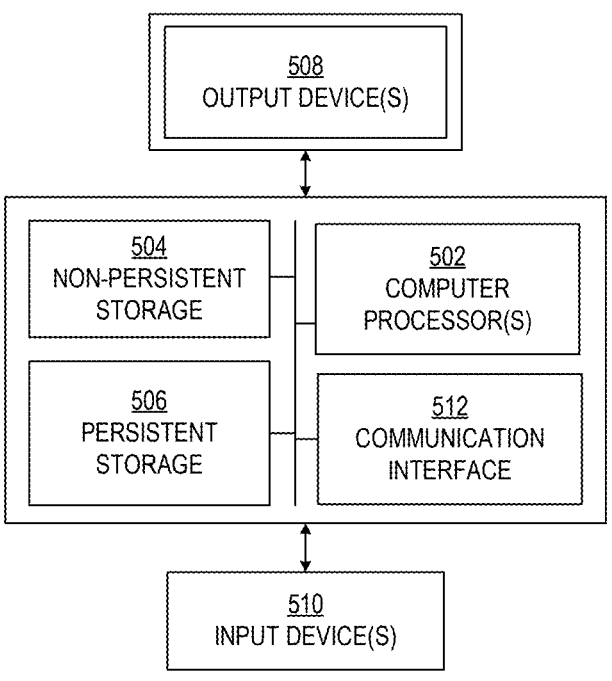
508
OUTPUT DEVICE(S)
504
NON-PERSISTENT
STORAGE
502
COMPUTER
PROCESSOR(S)
506
PERSISTENT
STORAGE
512
COMMUNICATION
INTERFACE
510
INPUT DEVICE(S)
*FIG. 5A*
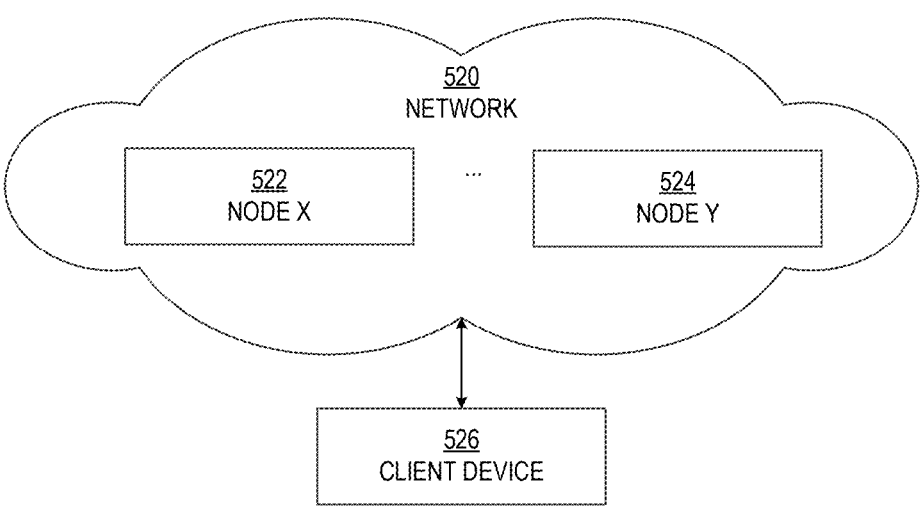
520
NETWORK
522
NODE X
...
524
NODE Y
526
CLIENT DEVICE
*FIG. 5B*

PROCESSING COMPLEX DATA STRUCTURES WITH LANGUAGE MODELS

BACKGROUND

In general, a complex data structure is a computer readable data structure designed to store large, interconnected, or hierarchical datasets efficiently. Examples of complex data structures include trees, tries, graphs, heaps, hash tables, disjoint sets, and others. As used herein, for reasons described further below, a "complex data structure" contains text, string value pairs, and executable arithmetic operations.

In some cases, it may be desirable for a language model to process a complex data structure. A language model is an artificial intelligence algorithm trained to understand and generate human language. A language model learns patterns from a large corpus of text and may use the patterns to predict words, answer questions, write content, and carry on conversations, etc. Thus, language models are useful tools for processing information.

However, language models often have difficulty processing complex data structures. When a language model is commanded to process a complex data structure, the language model often outputs incorrect answers (a phenomenon known as model "hallucination"). In some cases, the language model may not be able to process the complex data structure.

Language models may have particular difficulty processing complex data structures that include a combination of text and arithmetic functions (i.e., mathematical functions and in particular functions that involve addition, subtraction, multiplication, and division). In general, language models are not designed or trained for symbolic computation; rather, language models learn patterns in text. Instead of calculating, a language model relies on statistical text associations from training data. Thus, while a language model may correctly process complex language textual tasks, a language model may fail to correctly answer simple arithmetic problems. A language model may perform particularly poorly at precise logic or carry-over operations.

Nevertheless, there may be reasons to request a language model to process a complex data structure that includes both arithmetic (or other math function) and language. For example, tax and accounting forms may call on both arithmetic functions and text to be processed concurrently in order for the language model to output a correct answer. Similarly, peer-reviewed scientific journals may call on both arithmetic (or other math functions) and text to be processed concurrently in order for the language model to output a correct answer.

Thus, a technical problem is presented. The technical problem is how to permit a language model to process complex data structures that include both arithmetic functions and text, and yet minimize or avoid language model hallucination.

SUMMARY

One or more embodiments provide for a method. The method includes receiving a complex data structure including a combination of text and an arithmetic function. The method also includes generating a normalized data structure by normalizing the complex data structure against a static data structure schema. The method also includes processing, with a numerical solver, the arithmetic function of the normalized data structure to generate a function output. The method also includes generating a prompt by embedding the function output and the normalized data structure into a template prompt. The template prompt includes a first command to a language model to identify a contextual error in the normalized data structure. The template prompt also includes a context that defines a constraint applicable to the complex data structure. The template prompt also includes a second command to generate a model output formatted according to the static data structure schema. The model output includes the contextual error. The method also includes generating the model output by processing the prompt with the language model. The method also includes returning the model output.

One or more embodiments also provide for a system. The system includes a computer processor and a data repository in communication with the computer processor. The data repository stores a complex data structure including a computer readable data structure having a combination of text and an arithmetic function. The data repository also stores a normalized data structure and a static data structure schema. The data repository also stores a function output and a contextual error. The data repository also stores a context that defines a constraint applicable to the complex data structure. The data repository also stores a model output formatted according to the static data structure schema and including the contextual error. The data repository also stores a template prompt, and a prompt. The prompt includes a first command to a language model to identify the contextual error in the normalized data structure. The prompt also includes the context, and a second command to generate the model output. The system also includes a language model executable by the computer processor to generate the model output by processing the prompt. The system also includes a deterministic algorithm executable by the computer processor to process the arithmetic function of the normalized data structure to generate the function output. The system also includes a server controller executable by the computer processor to receive the complex data structure. The server controller is also executable by the computer processor to generate the normalized data structure by normalizing the complex data structure against the static data structure schema. The server controller is also executable by the computer processor to generate the prompt by embedding the function output and the normalized data structure into the template prompt. The server controller is also executable by the computer processor to return the model output.

One or more embodiments provide for another method. The method includes receiving a complex data structure including a computer readable data structure having a combination of text and an arithmetic function. The method also includes generating a normalized data structure by normalizing the complex data structure against a static data structure schema. The method also includes processing, with a deterministic algorithm, the arithmetic function of the normalized data structure to generate a function output. The method also includes identifying, with the deterministic algorithm and in the normalized data structure, a numerical error associated with the arithmetic function. The method also includes generating a prompt by embedding the function output and the normalized data structure into a template prompt. The template prompt includes a first command to a language model to identify a contextual error in the normalized data structure. The template prompt also includes a context that defines a constraint applicable to the complex data structure. The template prompt also includes a second command to generate a model output formatted according to the static data structure schema. The model output includes the contextual error. The method also includes generating the model output by processing the prompt with the language model. The method also includes returning the model output. The method also includes converting model output to natural language text. The method also includes identifying, in the context, a text rule violated by the contextual error. The method also includes returning, to a user device, a combination of the numerical error, the natural language text, and the text rule. The method also includes receiving, responsive to returning, a correction to the complex data structure. The method also includes updating the complex data structure to an updated data structure. The method also includes returning the updated data structure.

Other aspects of one or more embodiments will be apparent from the following description and the appended claims.

BRIEF DESCRIPTION OF DRAWINGS

FIG. 2 shows a flowchart of a method for processing complex data structures with language models, in accordance with one or more embodiments.

FIG. 3 shows an example architecture for processing complex data structures with language models, in accordance with one or more embodiments.

FIG. 4A shows an example complex data structure to be processed by a language model, in accordance with one or more embodiments.

FIG. 4B shows a sample grammar extract to be processed by a language model, in accordance with one or more embodiments.

FIG. 4C shows a sample prompt to be processed by a language model, in accordance with one or more embodiments.

FIG. 4D shows a sample output of a language model, in accordance with one or more embodiments.

FIG. 5A and FIG. 5B show a computing system and network environment, in accordance with one or more embodiments.

Like elements in the various figures are denoted by like reference numerals for consistency.

DETAILED DESCRIPTION

Figure 1:
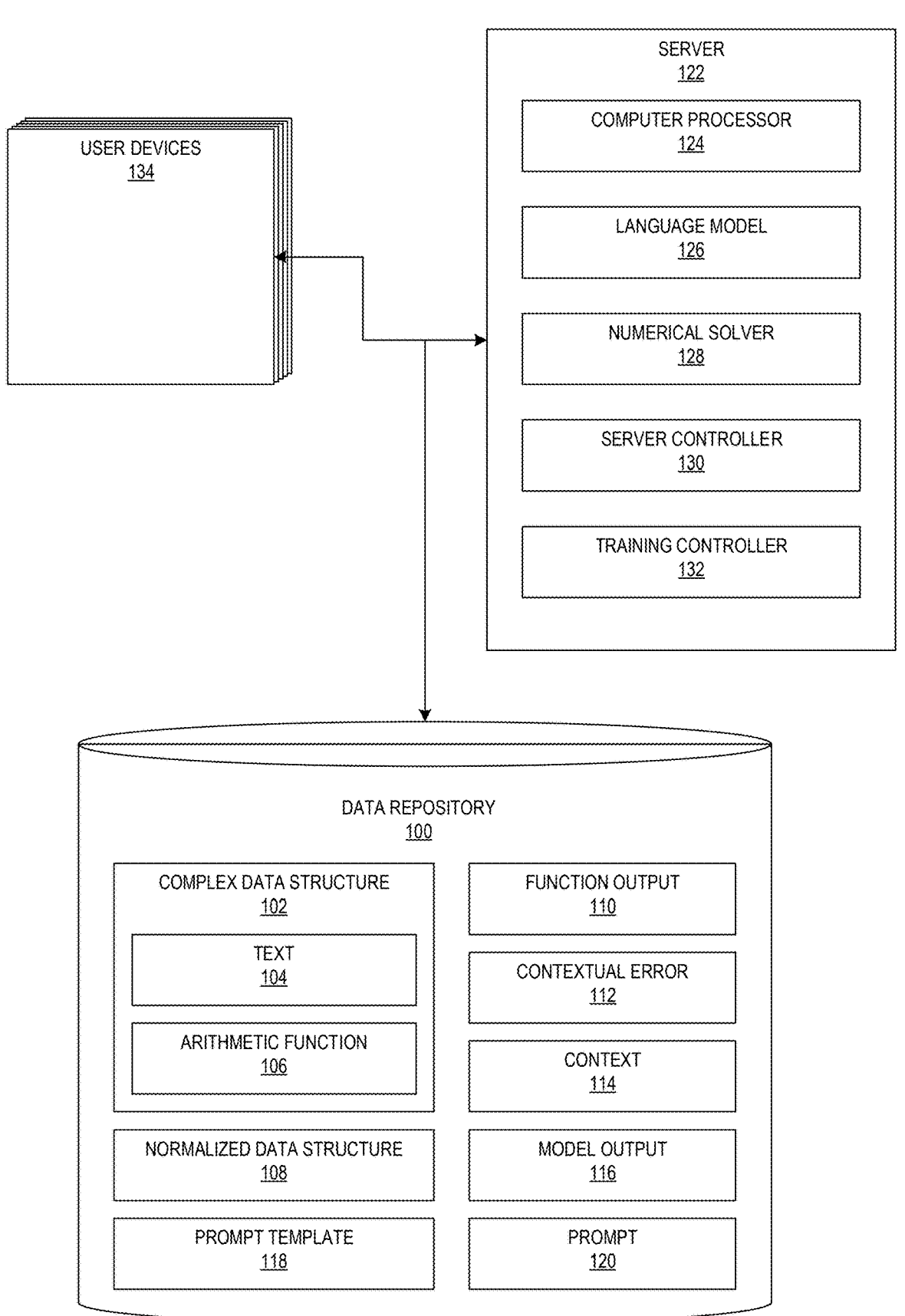
FIG. 1 shows a computing system for processing complex data structures with language models, in accordance with one or more embodiments.

One or more embodiments are directed to one or more technical solutions to the technical problem described above. Thus, one or more embodiments provide one or more technical solutions to the technical problem of how to permit a language model to process complex data structures that include both arithmetic functions and text, and yet minimize or avoid language model hallucination.

In brief summary, the technical solution involves a data flow that combines multiple techniques to avoid language model hallucination while processing a complex data structure. For example, one or more embodiments may leverage the ability of the language model to identify contextual errors in the complex data structure, yet also reduce or eliminate model hallucination that otherwise is likely to occur due to the arithmetic function or the syntax used in the complex data structure.

One or more embodiments initially may normalize the complex data structure against a static data structure schema. Normalizing the complex data structure helps to ensure that the language model receives a uniform input that corresponds to a uniform context, thereby reducing model hallucinations.

Next, one or more embodiments segments the arithmetic function in the complex data structure. A deterministic algorithm, which may process the arithmetic function without significant risk of error, generates a function output of the arithmetic function. Thus, the problem of language model hallucination when solving an arithmetic function may be avoided.

Then, a prompt is generated. The prompt is a command to the language model. The prompt is generated from a template prompt. The template prompt includes a command to identify a contextual error in the normalized data structure. A contextual error is an error that rises from the context of the language, not from an error in the arithmetic function. For example, if the complex data structure is a tax form, then a user may have inadvertently claimed a deduction to which the user is not entitled. While the arithmetic function returns a correct result when subtracting the improper deduction from the user's income (i.e., no error detected in the arithmetic function), nevertheless a contextual error is present in that the user was not entitled to list the deduction in the first place.

The result of an arithmetic function still may be important to the detection of the contextual error. For example, if the arithmetic function result is incorrect, then the model may incorrectly interpret the nature of the contextual errors. In a specific example, a user mistakenly enters a deduction amount in a tax form, but the user is not actually entitled to the deduction. The arithmetic function does not "know" that the deduction is not proper. Thus, the arithmetic function outputs an erroneous output value because the output value takes into account the improper deduction. Then, the language model may "assume" that the value is correct. As a consequence, the model fails to detect and output a contextual error (i.e., the contextual error is an improper deduction is present in the tax form, but in this example, the model "hallucinates" by failing to detect the contextual error). Stated differently, the result of the arithmetic function causes the model to incorrectly interpret the nature of the contextual error. However, one or more embodiments may consider the effect that the output of the arithmetic function may have on the presence or absence of a contextual error.

Returning to the template prompt, the template prompt also includes, or refers to, a context that defines a constraint applicable to the complex data structure. A context is a set of rules or facts, expressed in text, which are taken to be true. Continuing the above example, the context may be instructions for filling out the tax form, rules promulgated by a tax agency (e.g., the U.S. Internal Revenue Service), etc. In a specific example, the context may include a text rule indicating that a specific deduction type is disallowed, except under specific circumstances (e.g., pet expenses are disallowed deductions, unless the taxpayer is operating a business that cares for pets as a means of earning income).

The template prompt also includes another command to generate a model output according to the static data structure schema. The language model may be commanded to include the contextual error in the model output.

Next, the function output and the normalized data structure, generated above, are also added to the prompt. Then, the language model is commanded to process the prompt to generate a model output. When a contextual error is present, the contextual error may be returned in the model output.

Additional processing is also possible. For example, the model output may be in the form of a structured language data structure (e.g., a JAVASCRIPT® Object Notation (JSON) file). The language model may be commanded to convert the JSON file to a text summary that describes the error and where, in the complex data structure (e.g., a location in a form), the contextual error is present. The complex data structure then may be corrected and further processed (e.g., by form manipulation software).

Thus, one or more embodiments represent a technical solution to the technical problem described above. Namely, a language model may be used to identify a contextual error in a complex data structure that includes both text and an arithmetic function, even though in most cases language models cannot accurately process arithmetic functions. The technical solution is more than simply parsing the text and the arithmetic function, because the complex data structure still should be processed by the language model as a whole in order for the language model to achieve a higher accuracy. The overall flow described above addresses that additional technical issue.

Furthermore, one or more embodiments represent a general solution to the technical problem described above and are not limited to the examples described herein. For example, one or more embodiments also may be applied to processing and analyzing scientific papers which form complex data structures because such papers may include text and arithmetic functions in the forms of equations (possibly complex equations). Still other examples are possible.

Attention is now turned to the figures. FIG. 1 shows a computing system, in accordance with one or more embodiments. The system shown in FIG. 1 includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The data repository (100) stores a complex data structure (102). The complex data structure (102) is a computer readable data structure designed to store large, interconnected, or hierarchical datasets efficiently. Examples of complex data structures include trees, tries, graphs, heaps, hash tables, disjoint sets, and others. As used herein, the complex data structure (102) contains both text (104) and an arithmetic function (106).

The text (104) is one or more words of natural language text. Each word, or set of words, may be referred to as a token. The text (104) may include one or more tokens.

The arithmetic function (106) is a mathematical function executable by the computer processor (124) to generate a numerical or symbolic answer. In an embodiment, the arithmetic function (106) includes at least one of addition, subtraction, multiplication, or division. While the arithmetic function could be divided into tokens, in one or more embodiments the arithmetic function may not be divided in tokens but rather retained as an executable function that is executed separately from execution of the language model.

The data repository (100) also stores a normalized data structure (108). The normalized data structure (108) is the complex data structure (102), but transformed according to a predetermined, standardized schema. For example, the data repository (100) initially may be a JAVASCRIPT® Object Notation (JSON) file that contains data describing an electronic form including both the text (104) and the arithmetic function (106). However, to reduce language model hallucination, the complex data structure (102) may be converted or transformed into a normalized data structure (108) for which certain fields are required to appear in a certain order and according to a predetermined syntax. In the example, the normalized data file may be another JSON file that conforms to a predetermined structure and syntax. Thus, for example, the contents of the JSON file may be rearranged, truncated, expanded-upon, or otherwise modified to conform to the requirements of the normalized data structure (108).

The data repository (100) also stores a function output (110). The function output (110) is an output of the numerical solver (128) when executing on the arithmetic function (106) of the complex data structure (102). Thus, the function output (110) is one or more numbers or symbolic representations of the answer to the arithmetic function (106).

The data repository (100) also stores a contextual error (112). The contextual error (112) is an error detected by the language model (126) and stored as text that describes a nature of the contextual error (112). For example, the contextual error (112) may be text that indicates some of the text (104), the arithmetic function (106), or a combination thereof, violates a rule in a context (114) (defined below). The term "nature" refers to a description of the type of error, and possibly details of the error, represented by the contextual error (112).

The data repository (100) also stores a context (114). The context (114) is a source of data taken to be true. The language model (126) (defined below) may consider the context (114) during the method of FIG. 2 as part of a process of identifying the contextual error (112) in the complex data structure (102). The context (114), for example, may be rules or limitations placed on the complex data structure (102). The context (114) may be, in another example, a database of biological data which is taken as true when reviewing a complex data structure (102) for which the text (104) describes scientific biological research. The context (114) may be multiple sources of information and may include many different types of information.

The data repository (100) also stores a model output (116). The model output (116) is the output of the language model (126), defined below. The model output (116), in particular, may include the contextual error (112). However, in some cases, if the contextual error (112) is not detected or predicted, then the model output (116) may be an indication that no errors are present. The model output (116) may include multiple contextual errors. The model output (116) may include other information that the prompt (120) (defined below) instructed the language model (126) to provide.

The data repository (100) also stores a template prompt (118). The template prompt (118) is a prompt, as defined below with respect to the prompt (120). However, the template prompt (118) is pre-defined and may not include all the instructions, or may include a different version of instructions, that the prompt (120) will provide to the language model (126). For example, as described with respect to FIG. 2, the template prompt (118) may include standard instructions which are then modified to generate the prompt (120).

The prompt (120) is a set of text instructions that command the language model (126) to generate an output. The prompt (120) also may include other information, such as constraints on the model output (116), a system message that describes a perspective that the language model (126) should take or other considerations the language model (126) should consider, data structures, locations where data structures (e.g., the normalized data structure (108)) may be inserted, one or more of a variety of contexts, etc. The prompt (120) is defined during the method of FIG. 2.

The system shown in FIG. 1 may include other components. For example, the system shown in FIG. 1 also may include a server (122). The server (122) is one or more computer processors, data repositories, communication devices, and supporting hardware and software. The server (122) may be in a distributed computing environment. The server (122) is configured to execute one or more applications, such as the language model (126), the numerical solver (128), the server controller (130), or the training controller (132). An example of a computer system and network that may form the server (122) is described with respect to FIG. 5A and FIG. 5B.

The server (122) includes a computer processor (124). The computer processor (124) is one or more hardware or virtual processors which may execute computer readable program code that defines one or more applications, such as the language model (126), the numerical solver (128), the server controller (130), or the training controller (132). An example of the computer processor (124) is described with respect to the computer processor(s) (502) of FIG. 5A.

The server (122) also includes a language model (126). The language model (126) is a natural language processing machine learning model. An example of the language model (126) may be a large language model, such as CHATGPT®. However, different language models may be used. Use of the language model (126) is described with respect to FIG. 2.

The server (122) also includes a numerical solver (128). The numerical solver (128) is a deterministic algorithm (i.e., not the language model (126)) programmed to be executed, by the computer processor (124), on the arithmetic function (106). The numerical solver (128) may be referred to as a calculator. The input, the output, or both may be numbers or symbols. In any case, the numerical solver (128) may be programmed to correctly solve the arithmetic function (106) with a high degree of accuracy, relative to the accuracy of the language model (126) when attempting to solve the arithmetic function (106).

The server (122) also may include a server controller (130). The server controller (130) is software or application specific hardware which, when executed by the computer processor (124), controls and coordinates operation of the software or application specific hardware described herein. Thus, the server controller (130) may control and coordinate execution of the language model (126), the training controller (132), and the training controller (132).

The server (122) also may include a training controller (132). The training controller (132) is software or application specific hardware which, when executed by the computer processor (124), trains one or more machine learning models (i.e., the language model (126)).

Briefly, training proceeds by providing training data as input to an untrained version of a machine learning model (e.g., to an untrained version of the language model (126))). The untrained model generates an output that represents a prediction. Thus, for example, the output of the language model (126) is a prediction of a contextual error (112).

In supervised machine learning, the prediction is compared to a known true result. Supervised learning may be used, for example, to train the language model (126) in some examples. In particular, the training data may be associated with the known true results, and so the correct result that should have been output by the untrained model is known. The actual output of the untrained model is compared to the true result. The difference between the actual output and the true result is used to generate a loss function. The loss function, in turn, is used to adjust the parameters or settings of the machine learning model. Then, the process of inputting training data, generating a result, and comparing the predicted result to the known true result repeats. The process continues to repeat until the model predicts only true results, the model predicts true results according to a threshold percentage of the time (e.g., is correct 95% of the time), or after a threshold number of iterations is performed. The termination of the training process is referred to as "convergence."

In supervised learning, the process begins in a similar manner. Unsupervised learning may be used to train the language model (126) in some examples. However, in unsupervised learning, the true result is not known. Thus, no labels are available to label predicted results as true or false. Nevertheless, visualization (e.g., scatter plots) may be used to inspect clusters or reduce dimensions. Additionally, reconstruction error analysis (for the autoencoder neural network that may form the basis of the language model (126)), explained variance, and others may be used to evaluate the performance of the model. In any case, the performance of the model is quantitatively evaluated. Then, like in supervised learning, the performance of the model is used to generate a loss function. The loss function, again, modifies the parameters or other settings of the model, and the process repeats until convergence (as described above).

Thus, for either supervised or unsupervised model training, a process is performed in which the model processes training data, generates an output, compares the output to some standard (as described above), generates a loss function based on the comparison, and then modifies the parameters, settings, hyperparameters, etc., of the model to generate an updated version of the model. The process is iterative as the process repeats until convergence, which is a stop condition (as described above). Once the process is complete, the result is a trained machine learning model.

The above-described process may be referred to as a training phase of the machine learning model. Thereafter, the model may be used in an inference phase of the machine learning model. In the inference phase, new data (e.g., unknown data that for which a prediction of the model is desired) is provided as input to the trained model to generate a new prediction. Action then may be taken based on the new prediction (e.g., the complex data structure (102) may be revised to remove the contextual error (112)).

The system shown in FIG. 1 also may include one or more user devices (134). The user devices (134) are computing systems (e.g., the computing system (500) shown in FIG. 5A) that communicate with the server (122).

The user devices (134) may be considered remote or local. A remote user device is a device operated by a third-party (e.g., an end user of a chatbot) that does not control or operate the system of FIG. 1. Similarly, the organization that controls the other elements of the system of FIG. 1 may not control or operate the remote user device. Thus, a remote user device may not be considered part of the system of FIG. 1.

In contrast, a local user device is a device operated under the control of the organization that controls the other components of the system of FIG. 1. Thus, a local user device may be considered part of the system of FIG. 1.

While FIG. 1 shows a configuration of components, other configurations may be used without departing from the scope of one or more embodiments. For example, various components may be combined to create a single component. As another example, the functionality performed by a single component may be performed by two or more components.

FIG. 2 shows a flowchart of a method for processing complex data structures with language models, in accordance with one or more embodiments. The method of FIG. 2 may be executed using the system of FIG. 1.

Step 200 includes receiving a complex data structure including a combination of text and an arithmetic function. The complex data structure may be received from a number of different sources. For example, the complex data structure may be received from a user device pursuant to a request from the user device to process the complex data structure. The complex data structure may be received from another process hosted on a server that calls a language model to check the complex data structure for contextual errors. In any case, the complex data structure is received as input to the language model.

In an embodiment, receiving the complex data structure may include the text being represented by a hash. In this case, the method further may include validating, prior to generating the normalized data structure, the structured language data structure against the static data structure schema. Then, the method may include identifying, responsive to validating, that the complex data structure includes an error in at least one of the arithmetic function and a field in the complex data structure.

Step 202 includes generating a normalized data structure by normalizing the complex data structure against a static data structure schema. The normalized data structure may be generated by comparing the complex data structure to a static data structure schema and identifying differences therebetween. The complex data structure then may be modified by adding fields, modifying fields, rearranging fields, changing syntax, translating an original programming code language of the complex data structure to a new programming code language of the normalized data structure, or taking some other action to cause the complex data structure to conform to the static data structure schema.

In an embodiment, the generating of the normalized data structure may include correcting the error in the complex data structure. Then, generating the normalized data structure may include replacing the hash with the text.

Step 204 includes processing, with a numerical solver, the arithmetic function of the normalized data structure to generate a function output. Processing the arithmetic function includes providing the arithmetic function as input to the numerical solver and then using a computer processor to execute the numerical solver. The output of the numerical solver is the function output.

The numerical solver, being a deterministic algorithm, may solve the arithmetic function with a very low probability of error. Thus, use of the numerical solver avoids the likelihood of model hallucination caused by commanding the language model to solve the arithmetic function.

Step 206 includes generating a prompt by embedding the function output and the normalized data structure into a template prompt. Embedding may be performed by copying the text, numbers, or symbology of the function output and the normalized data structure into a predetermined template prompt.

When completed, the template prompt includes (in addition to commands already pre-selected and included in the template prompt) a first command to a language model to identify a contextual error in the normalized data structure. The template prompt also includes a context that defines a constraint applicable to the complex data structure. For example, the context may be rules applicable to the complex data structure or facts, taken to be true, against which data in the complex data structure may be checked for contextual errors. The template prompt also includes a second command to generate a model output formatted according to the static data structure schema. Thus, upon executing the language model on the prompt, the output of the language model will conform to the static data structure schema.

When a contextual error is present in the complex data structure, the model output will include the contextual error in normal operation of the language model (126). If no contextual error is present, then the language model may output a message that indicates that the complex data structure is free of errors.

Step 208 includes generating the model output by processing the prompt with the language model. The model output is generated by commanding a computer processor to execute the language model on the prompt. The model output includes the contextual error, if present.

The model output also may include other information. For example, if the prompt commands the model, then the model may output the normalized data structure, but highlight the sections of the normalized data structure that contain contextual errors. Again, if the prompt commands, the model, then the model may return text describing the contextual errors. Additionally, if the prompt commands the model, the model may return a portion or a summary of the context relating to the contextual error, together with an explanation of how a corresponding section in the normalized data structure constitutes a contextual error in view of the context. Still other variations are possible.

Still other variations are possible with respect to generating the model output. For example, the prompt further may include a command to the language model to output only a compliance object. A compliance object is a predetermined data structure which may be useful for processing by another software application. For example, the compliance object may be a JSON file or a hypertext transfer protocol (HTTP) file which then may be processed or executed by another software application (e.g., form manipulation software or a web browser). Other variations are possible.

In still another variation with respect to generating the model output, the prompt further may include a command requiring the language model to follow exactly a predetermined grammar structure. For example, a grammar structure for a particular area of endeavor (e.g., language used in form manipulation, language used in patents, language used in a specific area of scientific literature, etc.) may be specified in the prompt. In this manner, the output of the model may conform to expected grammar, syntax, and area-specific terms.

In yet another variation, the prompt further may include a context defining a grammar required by both the normalized data structure and the model output. In other words, the context may define the grammar specified in the above example. In this manner, the language model may compare the grammar structure in the normalized data structure and revise said normalized data structure accordingly. The language model also may use the context to help cause the model output to be consistent with the grammar used in the context. Still other variations are possible.

Step 210 includes returning the model output. The model output may be returned by a number of different techniques. For example, the model output may be displayed on a display device or may be stored in a non-transitory computer readable storage medium.

In a variation, the model output may be in a structured data output. In this case, returning the model output may include converting model output to natural language text. In this case, the natural language text may be returned to a user device. In addition, returning the model output may include identifying, in the context, a text rule violated by the contextual error. In this case, returning also may include returning the text rule to the user device.

In another variation, returning may include identifying, with the deterministic algorithm and in the normalized data structure, a numerical error associated with the arithmetic function. If the model output is in the standardized data schema then the model output may be converted into natural language text. Returning then may include identifying, in the context, a text rule violated by the contextual error. Returning may then include returning to a user device, a combination of the numerical error, the natural language text, and the text rule. Still other variations are possible.

The method of FIG. 2 may be further varied by adding, removing, or modifying steps. For example, the method also may include transforming, prior to generating the normalized data structure, the complex data structure into a structured language data structure including the text and the arithmetic function. In another variation, the method also may include training, prior to receiving the complex data structure, the language model on examples of the normalized data structure. Training may be performed using a training controller, such as the training controller (132) described with respect to FIG. 1. Yet further variations are possible.

While the various steps in the flowchart of FIG. 2 are presented and described sequentially, at least some of the steps may be executed in different orders, may be combined or omitted, and at least some of the steps may be executed in parallel. Furthermore, the steps may be performed actively or passively.

The method of FIG. 2 reduces model hallucination that could be caused by the complex data structure by using several techniques. First, the language model does not generate the solution to the arithmetic function. Thus, the function output is highly likely to be accurate. Second, the language model is provided a normalized data structure as input and also may be required to output in a structured language format. Thus, the language model receives a consistent syntax and data format, and so is more likely to return an accurate result. Third, the language model is provided with a context as part of the input. The context provides the language model with information regarding what sorts of language patterns in the normalized data structure may represent contextual errors. As a result, the language model is likely to return an accurate result regarding whether a contextual error exists, and to return an accurate determination regarding the nature and location of the contextual error. Thus, as a whole, the method of FIG. 2 represents a technical solution to the technical problem of a language model outputting an answer that is likely to be a hallucination when the input to the language model is a complex data structure.

FIG. 3 shows an example architecture for processing complex data structures with language models, in accordance with one or more embodiments. The architecture (300) may be a variation of the system shown in FIG. 1. The architecture (300) also may be used to implement the method shown in FIG. 2.

In an embodiment, the ingestion controller (302) may ingest the original input data (e.g., an electronic document). The ingestion controller (302) may transform the original input data structure to a structured language data structure. In an example, the ingestion controller (302) may output a JSON file that defines the input data in a structured format.

Then, the preprocessing controller (304) may transform the structured language data structure output by the ingestion controller (302) to a normalized data structure, as described with respect to step 202 of FIG. 2. The normalized data structure may be provided to a grammar controller (310), which may be used to check the grammar and syntax used in the normalized data structure against a context, as described with respect to FIG. 2.

In addition, the preprocessing controller (304) may include the numerical solver. The numerical solver may generate the function output, as described with respect to step 204 of FIG. 2.

Yet further, the preprocessing controller (304) may generate the prompt. Generation of the prompt is described with respect to step 206 of FIG. 2.

In any case, the output of the preprocessing controller (304) is at least the normalized data structure, the function output, and the prompt. The input is provided to the language model (306), which is then executed on the prompt. Generation of the output of the language model (306) is described with respect to step 208 of FIG. 2. In an embodiment, the output of the post-processing controller (308) may be a structured language data structure that identifies the contextual error, a location of a contextual error in the normalized data structure, a rule (copied or summarized from a context) that was violated by the contextual error, or combinations thereof.

The structured language data structure may be provided to a grammar controller (310). The grammar controller (310) may ensure that the grammar, syntax, and word choice in the structured language data structure conforms to the context or to a different context. In this way, the final output may be text, numbers, or symbology that conforms to a particular language pattern (e.g., language in a tax document, language in a scientific field of study, etc.).

The grammar controller (310) also may format or summarize or convert the output into natural language. The output then may be, for example, a natural language statement that identifies the contextual error, describes the location of the natural language error in the original electronic form (by reference to the normalized data structure), describes a rule pertaining to the contextual error, or combinations thereof.

FIG. 4A shows an example complex data structure to be processed by a language model, in accordance with one or more embodiments. The complex data structure (400) is derived from an electronic tax form. However, the complex data structure (400) has already been normalized to a static data structure schema, as described with respect to FIG. 2, so that the complex data structure (400) takes the form of a JSON file. The complex data structure (400) includes text (402), text (404), and an arithmetic function (406).

Due to the presence of the arithmetic function (406), simply providing the complex data structure (400) in a prompt that includes a command to a language model to check the complex data structure (400) for contextual errors is likely to result in language model hallucination. However, the method of FIG. 2 or the architecture of FIG. 3 may be used to mitigate or eliminate language model hallucination.

FIG. 4B shows a sample grammar extract to be processed by a language model, in accordance with one or more embodiments. The grammar extract (408) includes a number of rules expressed in text format but formatted according to the JSON structured language data structure (i.e., according to the static data structure schema). Thus, the grammar extract (408) includes rule (410), rule (412), and rule (414). The rules, as expressed in the grammar extract (408), form both a context and a grammar structure for the language model to follow when executing the prompt.

FIG. 4C shows a sample prompt to be processed by a language model, in accordance with one or more embodiments. The prompt (416) includes a system message (418). The system message (418) constrains how the language model will predict the model output (424) (in FIG. 4D). The prompt (416) also includes a command (420). The command (420) commands the language model to identify contextual errors in the form of compliance, or non-compliance, with the grammar extract (408) in FIG. 4B. The prompt (416) also includes a formatting command (422) that instructs the language model the format in which to return the model output.

FIG. 4D shows a sample output of a language model, in accordance with one or more embodiments. In particular, the language model is executed on the prompt (416) shown in FIG. 4C. The resulting model output (424) includes a first contextual error (426) and a second contextual error (428) which the language model identified in the complex data structure (400) of FIG. 4A. The model output (424) is in a structured language format (a JSON file in the example), which may be useful for consumption by other computer processes.

In the example, the model output (424) may be returned to tax preparation software hosted on an enterprise system. Because the model output (424) is in the format of a JSON file, the model output (424) is already in a computer readable data structure. The tax preparation software may be used to correct the complex data structure (400) of FIG. 4A.

In another embodiment, the model output (424) may be provided as a new input to the language model. The language model is then commanded, by way of a second prompt, to reformat the model output (424) in a natural language format that is more easily understood by a human. The natural language format of the model output (424) then may be displayed or otherwise returned to a user device so that the user may take appropriate action to correct the original form used to generate the complex data structure (400) of FIG. 4A.

Thus, one or more embodiments may be used for a large language model (LLM) powered tax grammar analysis system for identifying contextual errors in electronic tax documents. The language model may be specifically trained to handle tax grammar and compliance. Unlike general error detection in tax computations, one or more embodiments focus on the linguistic and syntactical aspects of the input, ensuring compliance with the nuanced language typical in tax documents.

One or more embodiments provide for a contextual analysis module (i.e., the architecture (300) of FIG. 3). While existing systems may perform error checking, such existing systems are error prone and subject to model hallucination when provided with complex data structure inputs. However, the ability of one or more embodiments to contextually analyze tax language and offer corrections that are legally compliant and pertinent to the specific context of the user's filings is a more advanced approach.

One or more embodiments also provide for real time grammar and compliance corrections with educational explanations. The integration of real-time, artificial intelligence grammar error detection combined with brief, understandable explanations rooted specifically in tax law nuances extends beyond the general error checking and educational tips found in existing tax software. One or more embodiments may be used to improve tax literacy and compliance through language and grammar accuracy.

One or more embodiments also may include a feedback loop system. The feedback system may be used to continually refine the language model's understanding and processing of tax grammar based on user interactions. In particular, the output of a language model may be evaluated for accuracy and completeness. The evaluation then may be used, together with the language model output, to retrain the language model. Thus, the language model becomes more capable and more accurate with respect to identifying contextual errors.

One specific example use of one or more embodiments is now provided. John Smith is a freelance graphic designer who runs a small business and is preparing his U.S. tax return for 2024, including a Schedule C (Profit or Loss from Business). He uses a LLM-Powered Tax Grammar and Compliance Assistant (i.e., the system of FIG. 1 or FIG. 3) to ensure accuracy and compliance.

Step 1 is the document submission and initial processing. John uploads his tax documents, including his Form 1040, W-2, 1099-NEC (for freelance income), and a detailed explanation for some of his Schedule C business expenses, to the system's document input interface. The text parsing engine then analyzes and extracts the text and numerical data, preparing it for processing. Internally, this data is structured into a machine-readable file in JSON format.

Step 2 is the preprocessing and normalization. Before the LLM sees the data, a preprocessing controller validates the raw JSON file against a static schema. The validation process ensures that the desired fields exist and are of the correct type. The validation process also normalizes names, units, extracts derived fields (like adjusted gross income, AGI), and embeds context into the prompt. In this manner, the LLM will see a uniform input, which helps reduce potential hallucinations.

Step 3 is the execution of the numeric solver deterministic algorithm. The system confirms that John's reported self-employment tax calculation is correct based on his net Schedule C profit. The deterministic numeric solver excels at such precise calculations. If John had accidentally entered $10,000 as his standard deduction for a single filer (when it should be $14,600 for 2024), the system would flag this based on pre-defined rules, just like a pure rule-based system would.

Step 4 is the execution of the large language model. On John's Schedule C, he has a footnote explaining a large "advertising expense" deduction for "payments made to social media influencers for promoting my new design portfolio." A traditional deterministic engine would find this rule hard to verify using brittle regular expressions. The deterministic engine would likely just see "advertising expense" and the amount, without understanding the nuance. However, the error detection large language model, which is specifically tailored for tax-related grammar and syntax, processes this natural language explanation. The contextual analysis module works with the LLM to understand that paying influencers for promotion is a legitimate business expense for a graphic designer's portfolio, and ensuring the expense is contextually appropriate according to tax laws.

Then, the LLM, guided by a "tax grammar" context (a "function spec" that constrains its output to machine-readable JSON), determines that the narrative explanation above aligns with deductible business expenses. If John had written, "Paid my friend for helping me move personal furniture," and tried to classify that text as a business expense, the LLM would likely flag it, explaining that personal expenses are not deductible business expenses, even if the numeric value was correct.

In addition, because the large language model consults a context, the system of one or more embodiments adapts to evolving regulations and laws. For example, if a new tax law for 2024 allowed a specific deduction for "digital content creators" that wasn't previously available, the system could incorporate this change via a grammar file update and a few-shot examples, without requiring recompilation of the language model. A deterministic engine would require manual rule coding.

If the LLM did find a contextual error (e.g., if John had tried to deduct personal clothing as a business expense), the generated violation would include a plain-English rationale, such as "Clothing for personal wear is generally not deductible as a business expense, even if worn for work, unless it's a uniform not suitable for everyday wear." The explanation output by the large language model may be more insightful than a simple "IF/THEN" rule violation from a deterministic system.

Step 5 is the correction and explanation generation. If any discrepancies were found (e.g., a misclassified expense, or a formatting error in a narrative attachment), the correction and explanation generator would immediately provide a clear and concise correction suggestion along with a brief educational explanation rooted in current tax regulations. For instance, if John had listed a personal expense under "Office Supplies," the system would suggest reclassifying it or removing it, explaining why it's not deductible.

Step 6 may be the user interaction and feedback. All detected errors, suggested corrections, and explanations are presented to John through an interactive user dashboard. John reviews these, understands the rationale, and applies the changes (or such changes may be made automatically and submitted to John for verification). If John finds an explanation particularly helpful or if he believes there's an edge case the LLM missed, he can provide feedback through the feedback loop system. The feedback may be used to continually train and refine the LLM, enhancing its accuracy and user experience over time. The compliance update system also ensures the LLM stays current with the latest tax laws, feeding new regulations into its knowledge base.

Step 7 includes the post processing and audit trail generation. After John accepts the changes, the system may hash the input return, grammar version, and model identifier, and then store the information on an immutable ledger for reproducibility and audit purposes. The system may generate a human-readable log (e.g., "Schedule C: advertising expense explanation verified by artificial intelligence as compliant") and then routes any remaining issues based on severity (e.g., Level 2 for a minor numeric inconsistency, queuing it for human review).

The example above demonstrates how one or more embodiments may use hybridization (i.e., a combination of deterministic algorithms and language models) to combine the best of both worlds: leveraging deterministic code for precise arithmetic logic and delegating fuzzy language interpretation to a constrained LLM. Thus, one or more embodiments may excel at complex narrative and attachment checks in complex data structures that traditional rule-based systems cannot process or cannot process accurately, while still providing robust numeric verification and clear, educational explanations to the user.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores, or micro-cores, of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN) such as the Internet, mobile network, or any other type of network) or to another device, such as another computing device, and combinations thereof.

Further, the output device(s) (512) may include a display device, a printer, external storage, or any other output device. One or more of the output device(s) (512) may be the same or different from the input device(s) (510). The input device(s) (510) and output device(s) (512) may be locally or remotely connected to the computer processor(s) (502). Many different types of computing systems exist, and the aforementioned input device(s) (510) and output device(s) (512) may take other forms. The output device(s) (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

The computing system (500) in FIG. 5A may be connected to, or be a part of, a network. For example, as shown in FIG. 5B, the network (520) may include multiple nodes (e.g., node X (522) and node Y (524), as well as extant intervening nodes between node X (522) and node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522) and node Y (524)) in the network (520) may be configured to provide services for a client device (526). The services may include receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method for reducing hallucination in a language model processing a complex data structure, the method comprising:
   receiving the complex data structure, wherein:
      the complex data structure comprises a combination of text and an arithmetic function,
      the arithmetic function comprises computer-executable code, and
      the complex data structure is stored in a non-transitory computer readable storage medium;
   generating a normalized data structure by normalizing the complex data structure against a static data structure schema by:
      comparing the complex data structure to the static data structure schema to identify a difference in schemas therebetween, and
      modifying the complex data structure to remove the difference so that the complex data structure conforms to the static data structure schema;
   processing, with a numerical solver, the arithmetic function of the normalized data structure to generate a function output;
   generating a prompt by embedding the function output and the normalized data structure into a template prompt, wherein the template prompt comprises:
      a first command to the language model to identify a contextual error in the normalized data structure, and
      a context that defines a constraint applicable to the complex data structure, and
      a second command to generate a model output formatted according to the static data structure schema, wherein the model output includes the contextual error;
   generating the model output by processing the prompt with the language model; and
   returning the model output.

2. The method of claim 1, wherein receiving the complex data structure comprises the text being represented by a hash, wherein the static data structure schema comprises a structured language data structure, and wherein the method further comprises:
   validating, prior to generating the normalized data structure, the structured language data structure against the static data structure schema; and
   identifying, responsive to validating, that the complex data structure includes an error in at least one of the arithmetic function and a field in the complex data structure; and
   wherein generating the normalized data structure further comprises:
      correcting the error in the complex data structure; and
      replacing the hash with the text.

3. The method of claim 1, further comprising:

transforming, prior to generating the normalized data structure, the complex data structure into a structured language data structure comprising the text and the arithmetic function.

4. The method of claim 1, wherein the prompt further comprises a third command to the language model to output only a compliance object.

5. The method of claim 1, wherein prompt further comprises a third command requiring the language model to follow exactly a predetermined grammar structure.

6. The method of claim 1, wherein the prompt further comprises a context defining a grammar required by both the normalized data structure and the model output.

7. The method of claim 1, further comprising:

training, prior to receiving the complex data structure, the language model on examples of the normalized data structure.

8. The method of claim 1, wherein returning comprises:

converting the model output to natural language text; and returning the natural language text to a user device.

9. The method of claim 8, wherein returning further comprises:

identifying, in the context, a text rule violated by the contextual error; and returning the text rule to the user device.

10. The method of claim 1, wherein returning further comprises:

identifying, with a deterministic algorithm and in the normalized data structure, a numerical error associated with the arithmetic function;

converting the model output to natural language text;

identifying, in the context, a text rule violated by the contextual error; and returning, to a user device, a combination of the numerical error, the natural language text, and the text rule.

11. A system for reducing hallucination in a language model processing a complex data structure, the system comprising:

a computer processor;

a data repository in communication with the computer processor and storing:

the complex data structure, wherein:

the complex data structure comprises a computer readable data structure having a combination of text and an arithmetic function, and the arithmetic function comprises computer-executable code, a normalized data structure, a static data structure schema, a function output, a contextual error, a context that defines a constraint applicable to the complex data structure, a model output formatted according to the static data structure schema and including the contextual error, a template prompt, and a prompt comprising:

a first command to the language model to identify the contextual error in the normalized data structure, and the context, and a second command to generate the model output;

a language model executable by the computer processor to:

generate the model output by processing the prompt;

a deterministic algorithm executable by the computer processor to:

process the arithmetic function of the normalized data structure to generate the function output; and a server controller executable by the computer processor to:

receive the complex data structure, generate the normalized data structure by normalizing the complex data structure against the static data structure schema by:

comparing the complex data structure to the static data structure schema to identify a difference in schemas therebetween, and modifying the complex data structure to remove the difference so that the complex data structure conforms to the static data structure schema, generate the prompt by embedding the function output and the normalized data structure into the template prompt, and return the model output.

12. The system of claim 11, wherein receiving the complex data structure comprises the text being represented by a hash, wherein the static data structure schema comprises a structured language data structure, and wherein the server controller is further executable by the computer processor to:

validate, prior to generating the normalized data structure, the structured language data structure against the static data structure schema; and identify, responsive to validating, that the complex data structure includes an error in at least one of the arithmetic function and a field in the complex data structure; and wherein generating the normalized data structure further comprises:

correcting the error in the complex data structure; and replacing, prior to generating the normalized data structure, the hash with the text.

13. The system of claim 11, wherein the server controller is further executable by the computer processor to:

transform, prior to generating the normalized data structure, the complex data structure into a structured language data structure comprising the text and the arithmetic function.

14. The system of claim 11, wherein the prompt further comprises a third command to the language model to output only a compliance object.

15. The system of claim 11, wherein prompt further comprises a third command requiring the language model to follow exactly a predetermined grammar structure.

16. The system of claim 11, wherein the prompt further comprises a context defining a grammar required by both the normalized data structure and the model output.

17. The system of claim 11, further comprising:

a training controller executable by the computer processor to training, prior to receiving the complex data structure, the language model on examples of the normalized data structure.

18. The system of claim 11, wherein the server controller is further executable by the computer processor to further return the model output by:

converting the model output to natural language text; and returning the natural language text to a user device.

19. The system of claim 18, wherein the server controller is further executable by the computer processor to further return the model output by:

identifying, in the context, a text rule violated by the contextual error; and returning the text rule to the user device.

20. A method for reducing hallucination in a language model processing a complex data structure, the method comprising:

receiving the complex data structure, wherein:

the complex data structure comprises a combination of text and an arithmetic function, the arithmetic function comprises computer-executable code, and the complex data structure is stored in a non-transitory computer readable storage medium;

generating a normalized data structure by normalizing the complex data structure against a static data structure schema by:

comparing the complex data structure to the static data structure schema to identify a difference in schemas therebetween, and modifying the complex data structure to remove the difference so that the complex data structure conforms to the static data structure schema;

processing, with a deterministic algorithm, the arithmetic function of the normalized data structure to generate a function output;

identifying, with the deterministic algorithm and in the normalized data structure, a numerical error associated with the arithmetic function;

generating a prompt by embedding the function output and the normalized data structure into a template prompt, wherein the template prompt comprises:

a first command to the language model to identify a contextual error in the normalized data structure, and a context that defines a constraint applicable to the complex data structure, and a second command to generate a model output formatted according to the static data structure schema, wherein the model output includes the contextual error;

generating the model output by processing the prompt with the language model;

returning the model output;

converting model output to natural language text;

identifying, in the context, a text rule violated by the contextual error;

returning, to a user device, a combination of the numerical error, the natural language text, and the text rule;

receiving, responsive to returning, a correction to the complex data structure;

updating the complex data structure to an updated data structure; and returning the updated data structure.

* * * * *